United States Patent [19]

Yoldas

[11] 4,278,632
[45] Jul. 14, 1981

[54] METHOD OF CONFORMING CLEAR VITREOUS GEL OF SILICA-TITANIA MATERIAL

[75] Inventor: Bulent E. Yoldas, Churchill, Pa.

[73] Assignee: Westinghouse Electric Corp., Pittsburgh, Pa.

[21] Appl. No.: 119,689

[22] Filed: Feb. 8, 1980

[51] Int. Cl.³ ............................................. C03C 3/04
[52] U.S. Cl. ............................ 264/66; 65/DIG. 14; 106/52; 264/61
[58] Field of Search ............ 65/DIG. 14, 17; 106/52; 264/66, 61

[56] References Cited

U.S. PATENT DOCUMENTS

| 3,640,093 | 2/1972 | Levene | 65/134 |
| 3,791,808 | 2/1974 | Thomas | 106/52 X |
| 3,811,918 | 5/1974 | Levene | 106/52 X |

OTHER PUBLICATIONS

Yoldas, B. E. "Preparation of Glasses and Ceramics from Metal-Organic Compounds" J. of Mat. Sci.–12 (1977) pp. 1203–1208.

*Primary Examiner*—Helen M. McCarthy
*Attorney, Agent, or Firm*—W. D. Palmer

[57] ABSTRACT

Method for forming clear vitreous material substantially comprising silica-titania binary which contains up to about 40 mole percent titania without melting the constituents used in forming the material. There is separately prepared a clear organic-solvent-solution of partially hydrolyzed alkoxide of one of the binary members. To this prepared solution is added the other binary member either in the form of alkoxide or a clear organic-solvent solution of partially hydrolyzed alkoxide of the other member. The mixed solutions are reacted and additional water is added as required to complete the hydrolysis of the alkoxide. The resulting product is dried and then heated at a relatively low temperature to evolve residual organic components. The binary vitreous material can be processed into monolithic silica-titania glass bodies, or silica-titania coatings for substrates, or into silica-titania vitreous powder which can be sintered into glass bodies or which can be melted at a lower temperature than normally required to form silica-titania glass.

5 Claims, 3 Drawing Figures

METHOD OF CONFORMING CLEAR VITREOUS GEL OF SILICA-TITANIA MATERIAL

CROSS-REFERENCE TO RELATED APPLICATIONS

In copending Application Ser. No. 065,706, filed Aug. 10, 1979, by Bulent E. Yoldas, the present applicant, and owned by the present assignee, is disclosed a method for forming anti-reflective films wherein specific relative amounts of metallic alkoxides including titanium alkoxides, alcohol solvent and water are reacted to produce partially hydrolyzed and polymerized clear solutions. These clear solutions are applied to a predetermined thickness onto a substrate to be coated, such as a surface of a silicon wafer as used in a solar cell. After the coating material is applied, it is heat treated and the resulting coated wafer has substantially decreased reflectivity for the energizing radiations for the solar cell. The index of refraction for the optical oxide film as deposited by this method, such as a film of a titania, can be varied by the addition of silica to the titania film. To deposit a titania-silica anti-reflective coating, separate clear solutions of partially hydrolyzed titanium alkoxides and silicon alkoxides are first separately prepared and then mixed, and thereafter the mixture is deposited onto the substrate to be coated. In such a coating the silica can be present in amount up to 30 mole percent of the coating constituents.

In copending Application Ser. No. 084,217, filed Oct. 12, 1979, by Bulent E. Yoldas, the present applicant, and owned by the present assignee, is disclosed a method for forming a heat mirror for an incandescent lamp envelope wherein a titania coating of predetermined thickness is first formed on the envelope interior envelope surface by depositing thereon to a predetermined thickness a clear solution of partially hydrolyzed titanium alkoxide. The envelope and applied solution are then heated to a limited temperature to convert the solution to a continuous titanium oxide layer. The heat mirror processing is then completed by applying over the titanium oxide film additional selected material.

BACKGROUND OF THE INVENTION

This invention relates to a method for forming silica-titania vitreous material and, more particularly, to a method for forming a clear vitreous material substantially comprising silica-titania binary which contains up to about 40 mole percent titania without melting the constituents used in forming the binary vitreous material.

Silica-titania is known as a glass forming system and constitute some of the most refractory glasses known. These glasses also exhibit a very low thermal expansion. For some applications, the silica-titania binary system possesses certain additional advantages over quartz, such as high temperature applications where some resistance to alkali vapor attack is desirable, lamp envelopes being an example. The lowest liquidus in the silica-titania binary is 1550° C. which corresponds to 10 mole percent titania-90 mole percent silica. As the titania content increases, the liquidus temperature rises rapidly and is 1780° C. at 20 mole percent titania. Because of the considerable difficulties encountered in the melting and the processing of these glasses, their use is quite limited. Most glasses in this system are limited to a titania content not to exceed 10 mole percent although glasses in the compositional range of 10 to 20 mole percent titania have been investigated with flame hydrolysis of the chlorides or induction melting at temperatures in excess of 1800° C. which are used to produce the glasses.

It is well known to prepare particulate metal oxides by hydrolyzing the metallic alkoxides thereof in order to produce an intermediate product which is then pyrolyzed to oxide form. A method for treating aluminum alkoxides to produce active alumina is disclosed in U.S. Pat. No. 3,944,658, dated Mar. 16, 1976 to B. E. Yoldas, the present applicant. A method for producing silica glass fibers and transparent silica glass from silicon tetraethoxide by hydrolysis, polymerization and heating at less than the melting temperature of silica is disclosed in Chem. Abstracts 90:141247f.

U.S. Pat. No. 2,689,858, dated Sept. 21, 1954 to Thomas Boyd discloses polymers of tetra-organo derivatives of orthotitanic acid which are soluble in organic solvent. These polymers are prepared by reacting alkyl titanates with a small amount of water to produce a haze-free polymer. The polymers have utility as modifiers for condensation resins.

U.S. Pat. No. 3,460,956, dated Aug. 12, 1969, to Dahle discloses the formation of thin titania coatings from clear alcohol-water solutions which are modified by the addition of lactic acid or nitric acid.

U.S. Pat. No. 2,768,909, dated Oct. 20, 1956, to Haslam discloses applying tetraalkyl titanate to a substrate and then hydrolyzing same from the moisture in the atmosphere in order to form a thin film which in some cases can be transparent.

U.S. Pat. No. 3,094,436, dated June 18, 1963, to Schroder discloses depositing on a substrate partially hydrolyzed organic titanic acid and/or silicic acid esters in an alcohol vehicle, which on heat treatment convert to transparent reflection-reducing film coatings.

In Proceedings, Tenth International Congress on Glass (July 1974) Kyoto, Japan, Part II, 13-44 to 13-48, report by Kimiya et al, are disclosed titania-silica glass systems prepared by mixing titanium alkoxide and silicon alkoxide and then hydrolyzing same by exposure to the humidity in the air for a week or so to form a solid or gel. The resulting gelled or solid masses are then heat treated at temperatures ranging from 300° C. to 1200° C.

SUMMARY OF THE INVENTION

There is provided a method for forming a clear vitreous material substantially comprising silica-titania binary which contains up to about 40 mole percent titania without melting the constituents used in forming the binary vitreous material. In accordance with this method, there is prepared as a precursor of one of the binary members of the vitreous material a predetermined amount of clear solution of partially hydrolyzed alkoxide which prior to hydrolyzation is represented by the formula $M(OR)_4$ wherein M is one of silicon and titanium, R is alkyl with from 1 to 6 carbon atoms, the solution solvent comprises organic solvent for any metallic or metalloid alkoxide precursor and any partially hydrolyzed metallic or metalloid alkoxide precursor used in forming the silica-titania vitreous material. In the case M is silicon, hydrolyzing water is present in amount of from about 1 mole to about 4 moles per mole of silicon alkoxide prior to hydrolyzation. In the case M is titanium, hydrolyzing water is present in amount of from about 1 mole to about 3 moles per mole of titanium alkoxide prior to hydrolyzation.

In a first method, there is added to and reacted with the foregoing prepared solution a predetermined amount of precursor of the other member of the binary vitreous material. This precursor is added in the form of a partially hydrolyzed clear solution of the other member which prior to hydrolyzation is represented by the formula $M'(OR)_4$ where M' is the other of silicon and titanium, R is alkyl with from 1 to 6 carbon atoms, the solution solvent comprises organic solvent for any metallic or metalloid alkoxide precursor and any partially hydrolyzed metallic or metalloid alkoxide precursor used in forming the silica-titania vitreous material. In the case M' is a silicon, hydrolyzing water is present in amount of from about 1 mole to about 4 moles of silicon alkoxide prior to hydrolyzation, and in the case M' is a titanium, hydrolyzing water is present in amount of from about 1 mole to about 3 moles per mole of titanium alkoxide prior to hydrolyzation.

In a second or alternative method, the initially prepared solution can have added thereto and reacted therewith alkoxide of the other member of the binary material which is represented by the formula $M'(OR)_4$ where M' is the other of silicon and titanium and R is alkyl with from 1 to 6 carbon atoms. In the foregoing reacted solutions, the predetermined amounts of the one member precursor relative to the other member precursor are such that the atom ratio of total combined titanium to total combined silicon is that molar ratio of a titania to a silica which is desired in the formed binary vitreous material.

There is then added to the resulting reacted solutions, any additional water as required to complete the hydrolysis of the titanium alkoxide and the silicon alkoxide. After hydrolysis is completed, the resulting reacted material is dried, and thereafter the dried material is heated to a temperature in the range of from about 400° C. to about 600° C. in order to evolve any residual organic components to produce a clear silica-titania binary vitreous material.

If it is desired to form a monolithic silica-titania glass member, the foregoing mixed and reacted precursors are formed into a gel. The resulting gel is conformed into a predetermined configuration, dried as hereinbefore, heated to evolve any residual organic components to produce a clear material, and the resulting conformed clear material sintered at a temperature below the melting temperature to form a monolithic glass member which has the predetermined configuration into which the gel is formed.

If it is desired to form the foregoing silica-titania binary into a coating on the substrate, additional organic solvent is added to the reacted solutions in amount sufficient to prevent the formation of a gel and after hydrolysis of the metallic alkoxide and metalloid alkoxide is completed, the resulting liquid solution is applied as a coating to a substrate. The applied coating is dried, then heated to a temperature as specified to evolve residual organic components, and thereafter sintered at a temperature below the melting point of the silica-titania binary material to form a silica-titania glass coating.

The foregoing silica-titania binary material can also be formed into a very active glass powder by sintering the formed material at a temperature below its melting temperature to eliminate porosity therein, with the sintered material thereafter reduced to finely divided silica-titania glass which is suitable for further processing to form refractory glass members.

BRIEF DESCRIPTION OF THE DRAWINGS

For a better understanding of the invention, reference may be had to the accompanying drawings, in which.

DESCRIPTION OF THE PREFERRED EMBODIMENTS

Figure 1:
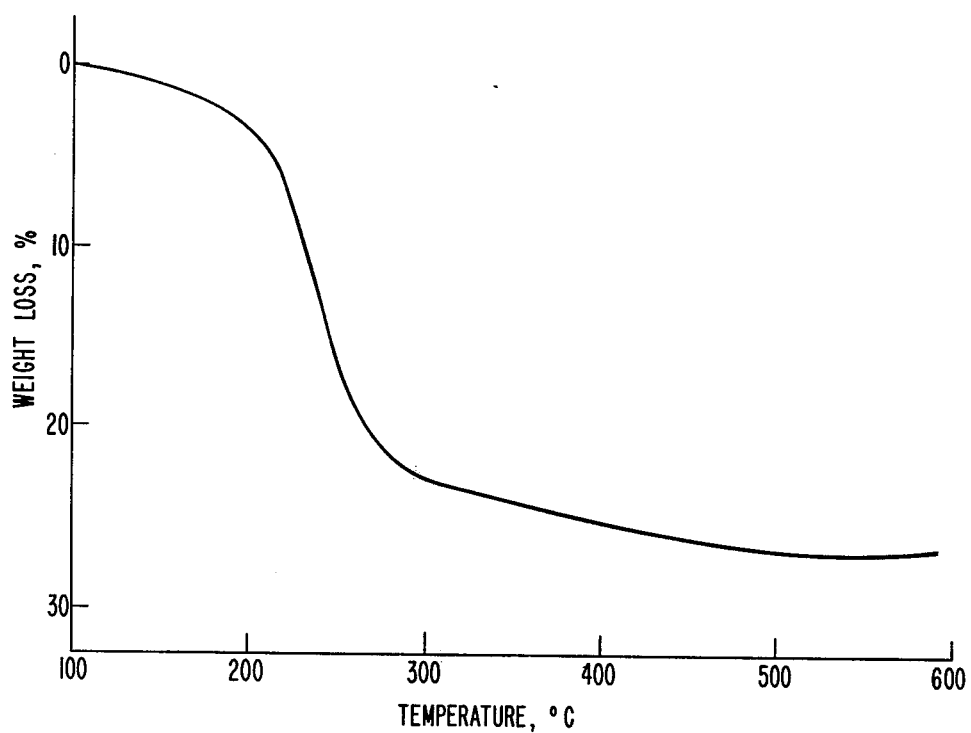
FIG. 1 is a pyrolysis curve of weight loss in percent vs. temperature for a particular silica-titania binary.

The production of metal hydroxides and metal oxides by hydrolyzation of metal alkoxides is well-known, as indicated hereinbefore. In accordance with these known techniques, both titania and silica can readily be obtained from their respective alkoxides. When mixtures of titanium alkoxide and silicon alkoxide are hydrolyzed in a reasonable period of time, there are produced fine particles of separate titania and silica, rather than a single phase glassy compound. The reason for this is that each alkoxide reacts separately with water to produce its own hydroxide and to form a glassy compound from these hydroxides, the mixture must be conventionally melted at extremely high temperatures to form the glass.

In accordance with the present method, a clear vitreous material substantially comprising silica-titania binary which contains up to about 40 mole percent titania is prepared without melting the constituents which are used to form the binary vitreous material. The basic method requires preparing as a precursor of one of the binary members a predetermined amount of clear solution of partially hydrolyzed alkoxide which, prior to hydrolyzation, is represented by the formula $M(OR)_4$ where M is one of silicon and titanium, R is alkyl with from 1 to 6 carbon atoms, and the solution solvent comprises organic solvent for any metallic or metalloid alkoxide precursor and any partially hydrolyzed metallic or metalloid alkoxide precursor used in forming the silica-titania vitreous material. In the case M is silicon, hydrolyzing water is present in the clear solution in amount of from about 1 mole to about 4 moles per mole of silicon alkoxide prior to hydrolyzation. In the case M is titanium, hydrolyzing water is present in the clear solution in amount of from about 1 mole to about 3 moles per mole of titanium alkoxide prior to hydrolyzation.

Titanium alkoxides are normally liquids and react extremely rapidly with water to form titanium hydroxides. Silicon alkoxides, however, are relatively slow to hydrolyze, and as a general rule, the hydrolyzation products do not precipitate, apparently because the resultant product is not a particular oxide or hydrate, but rather a clear, continuous complex polymer whose properties can vary depending upon the hydrolysis conditions. The polymer may be liquid, rubbery, or solid with a relatively high stability, and it will normally remain clear until pyrolized.

EXAMPLE I

In one example for practicing the present method, the initial precursor solution is prepared as a clear solution of partially hydrolyzed silicon alkoxide. As a specific example, silicon tetraethoxide, Si(OC$_2$H$_5$)$_4$ will be considered. This material is immiscible with water and its controlled hydrolysis with water requires a common, neutral solvent such as ethyl alcohol. This material is a suitable solvent not only for the silicon tetraethoxide and water, but also for their partially hydrolyzed reaction products. As a specific example, silicon tetraethoxide is initially mixed with an equal molar amount of ethyl alcohol. Water is then gradually added to this solution and the amount of water should be controlled so that hydrolysis of the ethoxide is not complete. As a specific example, 1 mole of water per mole of alkoxide is gradually added to the alkoxide-alcohol solution. A few drops of mineral acid, such as nitric acid, are desirably added as a catalyst. The resulting hydrolyzation takes place at ambient temperatures, but refluxing or maintaining the mixture at a temperature of 50° to 60° C. for several hours provides a suitable rate of hydrolyzation. The resulting product comprises soluble ethoxysilanol species which self-polymerize on aging, with the formation of numerous less active secondary species.

The other precursor of the binary material to be formed, a titanium alkoxide in this case, can be added to the initially formed silanol solution after it is cooled to room temperature. This other precursor of the binary to be formed can be added as a partially hydrolyzed clear solution or it can be added as the alkoxide. As a specific example, after the first-formed, partially hydrolyzed, silicon ethoxide solution is cooled to room temperature, a titanium alkoxide such as titanium ethoxide is introduced into the first-formed solution under vigorous stirring. There results a polymerization reaction between the silanol and the titanium alkoxide, and this reaction is strongly exothermic and proceeds at a relatively fast rate. The reaction is of the following type:

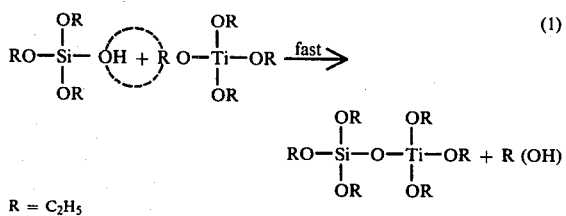

R = C$_2$H$_5$

Further polymerization with other silanols occurs with aging, as follows:

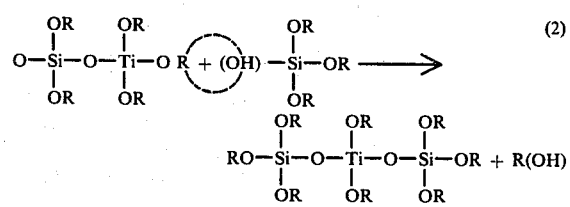

The titanium can also be introduced in a clear, partially hydrolyzed solution, rather than an unhydrolyzed alkoxide. Titanium alkoxides normally vigorously hydrolyze with water resulting in precipitates which are not suitable for further polymerization. If care is taken to insure the retention of "OR" groups in the structure, however, the hydrolysis product is soluble in alcohol and contains polymerizing species which can be used to form an oxide network. Details of preparation of polymerizable titania species in a clear solution form are described in the foregoing referenced copending application Ser. No. 065,706 filed Aug. 10, 1979. To prepare such a clear solution, the concentration of equivalent titania is kept below 5% and there is also included a carefully controlled amount of water and a small amount of mineral acid, such as nitric acid. The clear partially hydrolyzed titania solution may be reacted with either the ethoxysilanol or with silicon alkoxide, as will be described hereinafter, to form silica-titania glasses, for example:

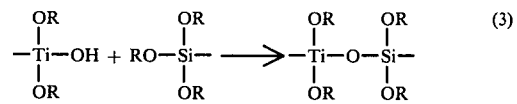

Since these reactions (1, 2, 3) proceed at a much faster rate than the initial silanol polymerization reaction, dissimilar constituents tend to become neighbors in the resulting product. The amount of titanium ethoxide which is added to the first precursor solution is such that the atom ratio of total combined silicon in the first solution to the atom ratio of total combined titanium in the reacted solution is that molar ratio of silica to titania which is desired in the binary vitreous material to be formed. As a specific example, the molar ratio of silica to titania in the formed material can be from 90:10 to 80:20.

Summarizing the addition of the second precursor to the initially prepared precursor solution, there is added to and reacted with the initially prepared solution a predetermined amount of precursor of the other member of the binary vitreous material which can be in one of two forms. In the first form it will be a partially hydrolyzed clear solution of the other member which prior to hydrolyzation is represented by the formula M'(OR)$_4$ where M' is the other of silicon and titanium, R is alkyl with from 1 to 6 carbon atoms, the solution solvent comprises organic solvent for any metallic or metalloid alkoxide precursor and any partially hydrolyzed metallic or metalloid alkoxide precursor used in forming the silica-titania vitreous material. In the case M' is silicon, hydrolyzing water is present in amount of from about 1 mole to about 4 moles per mole of silicon alkoxide prior to hydrolyzation, and in the case M' is titanium, hydrolyzing water is present in amount of from about 1 mole to about 3 moles per mole of titanium alkoxide prior to hydrolyzation.

Alternatively, the other member of the binary material to be formed can be added to the initially prepared solution as alkoxide which is represented by the formula M'(OR)$_4$ where M' is the other of silicon and titanium and R is alkyl with from 1 to 6 carbon atoms. As indicated before, the predetermined amounts of the one member precursor relative to the other member precursor in the reacted solutions are such that the atom ratio of total combined titanium to total combined silicon is that molar ratio of titania to silica which is desired in the formed binary vitreous material.

After the precursor solutions are mixed as in the foregoing example, additional water is added to the reacted solutions as required to complete the hydrolysis of the titanium alkoxide and the silicon alkoxide. As indicated hereinbefore, if partially hydrolyzed clear solutions of the individual alkoxides are to be utilized, the hydrolyzing water should be present in amount of from about 1 mole to about 4 moles per mole of silicon alkoxide prior to hydrolyzation, and in the case of titanium, the hydrolyzing water should be present in amount of from about 1 mole to about 3 moles per mole of titanium alkoxide prior to hydrolyzation. At the upper end of these water-content ranges, it will normally not be necessary to add any appreciable additional water to complete the hydrolyzation of the alkoxides. Upon completion of the hydrolyzation, further polymerization and cross linking occurs. In the usual case, the entire reacted solution gels into a clear, stiff, single phase containing a chemically formed glass network.

In the next step of preparation, the formed reacted material is slowly dried such as by heating to a temperature in the range of 200° to 300° C., although this drying temperature can be varied considerably. Thereafter, the dried material is maintained at a temperature in the range of from about 400° C. to about 600° C. for a sufficient time to evolve any residual organic components, in order to produce the clear silica-titania binary vitreous material. The final heating time can be varied depending on the temperature and configuration of the material being treated, along with other processing variations. Normally a heating time of four hours at a temperature of 550° C. will be sufficient to produce a clear material.

The formed material can be further processed into various configurations and structures using different techniques. X-ray diffraction of the silica-titania binary which contains up to about 40 mole percent titania confirms the glassy or amorphous nature of this material. The formed material can readily be sintered to a densified status by heating to a temperature below the melting point of the binary material, and sintering at temperatures in the range of 800° to 1000° C. will normally provide a densified material.

EXAMPLE II 1 mole (208 g) of silicon tetraethoxide is mixed with 200 g dry ethyl alcohol. To this mixture 1 mole (18 g) water is gradually added, along with 3 drops of nitric acid per 100 mg of solution, with constant stirring. The resulting mixture is heated to 60° C. and fluxed for two hours, and then cooled to room temperature. The resulting solution contains the equivalent of 60 g silica in a partially hydrolyzed silanol form. To this solution is added 57 grams of titanium ethoxide and the resulting exothermic reaction is indicated by warming of the mixture. The mixture contains 60 g of equivalent silica and 20 g of equivalent titania in a reacted and partially hydrolyzed form. The solution is allowed to stand for one to two hours and three additional moles of water are slowly added. This addition causes the solution to gel into a clear, single phase. The gel is permitted to dry initially at room temperature and then is heated to 100° C. to complete the drying. The dried material is then heated to from about 400° C. to about 600° C. to evolve any residual organic components, and the weight loss of the material as a function of heating temperature is shown in FIG. 1. The resulting material has an amorphous structure, as confirmed by X-ray diffraction.

EXAMPLE III

Figure 2:
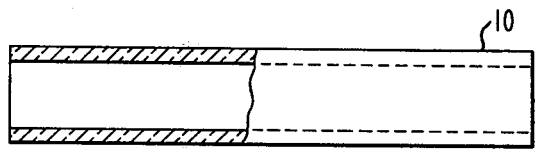
FIG. 2 is an elevational view, shown partly in section, of a silica-titania glass tubing which is formed in accordance with the present method.

For processing the binary vitreous material, after the binary precursor solutions are reacted and formed into a gel, the resulting gel is extruded into a form as desired, such as a tubular arc tube for a discharge device. The conformed gel is initially dried at room temperature and then dried by heating to a temperature of 200°–250° C. for a period of 1–3 hours, depending on the size. The conformed and dried member is then heated to a temperature in the range of from about 400° C. to about 600° C. in order to evolve any residual organic components to produce a clear material. Thereafter the resulting conformed clear material is sintered at a temperature below its melting temperature to the form of a monolithic glass tubular member having the configuration into which the gel is initially extruded. As a specific example, the conformed, clear member is sintered at a temperature of approximately 1200° C. for a period of 2 hours in order to form the monolithic glass member. A tubular arc tube member formed in accordance with this process is shown in FIG. 2 wherein the member 10 has a length of 8 centimeters, a wall thickness of 2 mm, and an outer diameter of 0.8 cm, with the composition comprising 90 molar percent silica and 10 molar percent titania.

EXAMPLE IV

Figure 3:
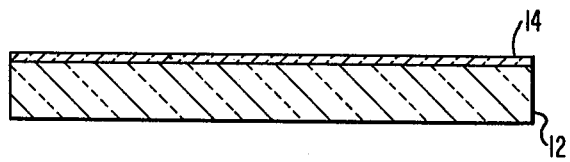
FIG. 3 is a sectional elevational view of a refractory vitreous substrate which is provided with a silica-titania glass coating thereon in accordance with the present invention.

As another example for processing the formed binary material, for the material as prepared in accordance with Example I, 1000 cc of additional organic solvent such as ethanol are added to the precursor solution in order to lower the concentration, thus to prevent the formation of a gel, and reaction between the silanol and titanium alkoxide is completed in the manner as described hereinbefore. The hydrolysis is limited to 2 moles of water per mole of total alkoxide. The resulting liquid solution is applied as a coating to an inorganic refractory substrate which is desired to be coated. The applied liquid coating is dried for a few minutes at room temperature, and the dried coating is heated to a temperature in the range of from about 400° C. to about 600° C. for a sufficient period to evolve any residual organic components to produce a clear silica-titania binary vitreous coating. As a specific example, this heating is conducted at a temperature of 550° C. for a period of five minutes. The clear coating is denser when heat treated in vacuum. Also denser coatings are obtained when sintered at higher temperatures such as 1000° C. for a period of five minutes to densify the applied coating to the form of a transparent silica-titania glass coating on the substrate. The end product is shown in FIG. 3 wherein the refractory substrate 12 is formed of quartz and a silica-titania coating 14 which comprises a 90:10 silica titania glass is carried on the substrate 12 as a coating 14 having a thickness of 0.1 μm.

EXAMPLE V

As yet another example for processing the silica-binary vitreous material, after organic components are evolved therefrom by heating in the manner as specified, the resulting clear vitreous material is sintered at a temperature below its melting temperature in order to substantially eliminate all porosity therein. The pyrolyzed material is reduced to finely divided silica-titania glass which is suitable for further processing into nonporous silica-titania glass of desired configuration. This powder can be formed into glass members by sintering at below its melting temperature or it can be melted. As specific example, for a 90:10 silica-titania glass powder, the powder can be melted at a temperature of approximately 1600° C. which is a lower melting temperature than normally needed to form such a glass from its raw material constituents. This has definite processing advantages.

EXAMPLE VI

In the foregoing Example I, the initial precursor solution was partially hydrolized silicon alkoxide. It is also possible to form an initial partially hydrolized clear precursor solution from titanium alkoxide. The preparations of such solutions are described in detail under Example II and in aforementioned copending Application Ser. No. 065,706, filed Aug. 10, 1979. As a further specific example, 22.8 grams of titanium ethoxide is added to 102 grams ethyl alcohol. As a separate solution, 3.5 grams water and four drops of a mineral acid such as hydrochloric acid are added to 100 grams ethyl alcohol, and these two preparations are mixed and aged for several hours. This will provide a clear solution of partially hydrolyzed titanium alkoxide. There is then added to this solution either the silicon alkoxide as specified or a partially hydrolyzed clear solution of silicon alkoxide as specified. As a specific example, the second precursor in this case can comprise silicon ethoxide or a partially hydrolyzed clear solution of silicon ethoxide dissolved in ethanol, either of which are added to the clear partially hydrolyzed titanium alkoxide solution. The resulting reacted solutions are then completely hydrolyzed in the manner as specified hereinbefore, dried in the manner as described, and thereafter heated to a temperature in the range of from about 400° C. to about 600° C. in order to evolve any residual organic components to produce the clear silica-titania binary vitreous material.

EXAMPLE VII

In Example I, titanium alkoxide was added to the initially prepared partially hydrolized silicon alkoxide solution. Alternatively, the foregoing partially hydrolyzed, clear titanium ethoxide solution as specified under Example V can be added to the initially prepared silicon alkoxide solution, with the atom ratio of combined silicon to titanium maintained as desired in the final glass. Other details remain as specified under Example I.

While specific examples have been given for particular alkoxides, other alkoxides can be substituted therefor, as represented by the formula $M(OR)_4$, wherein M is one of silicon and titanium, and R is alkyl with from 1 to 6 carbon atoms. The preferred solution solvent will normally comprise liquid aliphatic alcohol with ethanol being preferred, although other organic solvents can be substituted therefor. In the case of silicon alkoxide, the hydrolyzing water should be present in amount of from about 1 mole to about 4 moles per mole of silicon alkoxide prior to hydrolyzation, and in the case of titanium alkoxide, the hydrolyzing water should be present in amount of from about 1 mole to about 3 moles per mole of titanium alkoxide prior to hydrolyzation.

The present process permits the formation of clear monolithic silica-titania glasses which include titania in the molar range of 20 to 40 percent. As far as is known, these silica-titania vitreous materials have not been formed heretofore, except by using an atmospheric hydrolysis, which is not practical from a time standpoint. Certain advantages also accrue from the method in that equivalent compositions prepared by classical glass melting methods require much higher temperatures for processing and the material as prepared by the present method can be sintered or even melted at substantially lower temperatures than those which utilized the conventional melting practices.

I claim:
1. The method of forming a monolithic clear vitreous member substantially comprising silica-titania binary which contains up to about 40 mole percent titania without melting the constituents used in forming the monolithic clear vitreous member, which method comprises:
    (a) preparing as a precursor of one of said binary constituents a predetermined amount of clear solution of partially hydrolyzed alkoxide which prior to hydrolyzation is represented by the formula $M(OR)_4$ where M is one of silicon and titanium, R is alkyl with from 1 to 6 carbon atoms, the solution solvent comprises organic solvent for any metallic or metalloid alkoxide precursor and any partially hydrolyzed metallic or metalloid alkoxide precursor used in forming said silica-titania vitreous member, in the case M is silicon hydrolyzing water is present in amount of from about 1 mole to about 4 moles per mole of silicon alkoxide prior to hydrolyzation, and in the case M is titanium hydrolyzing water is present in amount of from about 1 mole to about 3 moles per mole of titanium alkoxide prior to hydrolyzation;
    (b) adding to and reacting with said prepared solution a predetermined amount of precursor of the other of said binary constituents in the form of (1) a partially hydrolyzed clear solution of said other binary constituents which prior to hydrolyzation is represented by the formula $M'(OR)_4$ where M' is said other of silicon and titanium, R is alkyl with from 1 to 6 carbon atoms, the solution solvent comprises organic solvent for any metallic or metalloid alkoxide precursor and any partially hydrolyzed metallic or metalloid alkoxide precursor used in forming said silica-titania vitreous member, in the case M' is silicon hydrolyzing water is present in amount of from about 1 mole to about 4 moles per mole of silicon alkoxide prior to hydrolyzation, and in the case M' is titanium hydrolyzing water is present in amount of from about 1 mole to about 3 moles per mole of titanium alkoxide prior to hydrolyzation; or (2) alkoxide of said other binary constituents which is represented by the formula $M'(OR)_4$ where M' is said other of silicon and titanium and R is alkyl with from 1 to 6 carbon atoms; and including with at least one of said precursors a small amount of suitable mineral acid, and said predetermined amounts of said one binary precursor relative to said other binary precursor being such that the atom ratio of total combined titanium to total combined silicon is that molar ratio of titania to silica which is desired in the formed monolithic clear vitreous member;
    (c) adding to the resulting reacted solution any additional water as required to complete the hydrolysis reaction of said titanium alkoxide and said silicon alkoxide, and allowing to stand until said reacted precursors form into a gel which is a clear, stiff, single phase containing a chemically formed glass network;
    (d) conforming the gel into a member having a predetermined configuration, slowly drying the conformed member, and heating the resulting conformed and dried member at a temperature in the range of from about 400° C. to about 600° C. to evolve any residual organic components to produce a clear member; and (e) sintering the resulting conformed clear member at a temperature below its melting temperature to form said monolithic clear vitreous member which has the predetermined configuration into which the gel is initially formed.

2. The method as specified in claim 1, wherein M is silicon and M' is titanium.

3. The method as specified in claim 2, wherein $M(OR)_4$ is $Si(OC_2H_5)_4$, the solution solvent is ethanol, and $M'(OR)_4$ is $Ti(OC_2H_5)_4$.

4. The method as specified in claim 1, wherein M is titanium and M' is silicon.

5. The method as specified in claim 4, wherein $M(OR)_4$ is $Ti(OC_2H_5)_4$, the solution solvent is ethanol to which said hydrolyzing water is added along with a small amount of mineral acid, and $M'(OR)_4$ is $Si(OC_2H_5)_4$.

* * * * *